United States Patent
Kohinata

(10) Patent No.: US 10,676,573 B2
(45) Date of Patent: Jun. 9, 2020

(54) AROMATIC POLYSULFONE RESIN AND METHOD FOR PRODUCING SAME

(71) Applicant: Sumitomo Chemical Company, Limited, Tokyo (JP)

(72) Inventor: Yusaku Kohinata, Tsukuba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/781,598

(22) PCT Filed: Dec. 6, 2016

(86) PCT No.: PCT/JP2016/086234
§ 371 (c)(1),
(2) Date: Jun. 5, 2018

(87) PCT Pub. No.: WO2017/099080
PCT Pub. Date: Jun. 15, 2017

(65) Prior Publication Data
US 2018/0371171 A1 Dec. 27, 2018

(30) Foreign Application Priority Data
Dec. 8, 2015 (JP) .................................. 2015-239124

(51) Int. Cl.
| | | |
|---|---|---|
| C08G 75/23 | (2006.01) | |
| C08G 65/42 | (2006.01) | |
| C08G 75/20 | (2016.01) | |
| C08G 85/00 | (2006.01) | |

(52) U.S. Cl.
CPC ............ *C08G 75/23* (2013.01); *C08G 65/42* (2013.01); *C08G 75/20* (2013.01); *C08G 85/002* (2013.01)

(58) Field of Classification Search
CPC .............................. C08G 78/23; C08G 85/002
See application file for complete search history.

(56) References Cited

U.S. PATENT DOCUMENTS

| | | | | |
|---|---|---|---|---|
| 3,919,380 A | * | 11/1975 | Smarook | B29C 67/00 264/164 |
| 4,065,437 A | * | 12/1977 | Blinne | C08G 75/23 528/125 |
| 4,775,738 A | * | 10/1988 | Mayska | C08G 75/23 528/171 |
| 5,047,496 A | * | 9/1991 | Eckel | C08G 75/23 528/125 |
| 6,420,514 B1 | * | 7/2002 | Hage | C08G 75/23 528/171 |
| 6,562,935 B1 | | 5/2003 | Harada | |
| 2006/0167216 A1 | * | 7/2006 | Johnson | C08G 65/40 528/373 |
| 2006/0189752 A1 | * | 8/2006 | Krueger | C08L 63/00 525/55 |
| 2008/0032096 A1 | * | 2/2008 | Bourdelais | B32B 27/08 428/156 |
| 2009/0018265 A1 | * | 1/2009 | Kailasam | C08L 79/08 524/609 |
| 2009/0275725 A1 | | 11/2009 | Dienes et al. | |
| 2009/0283476 A1 | * | 11/2009 | Schwab | B01D 71/68 210/654 |
| 2012/0149796 A1 | | 6/2012 | Weber et al. | |
| 2012/0190764 A1 | * | 7/2012 | Kohinata | B01D 67/0009 521/180 |
| 2013/0109831 A1 | * | 5/2013 | Lutz | C08G 65/00 528/174 |
| 2013/0150507 A1 | * | 6/2013 | Gallucci | C08L 81/06 524/132 |
| 2013/0324648 A1 | | 12/2013 | Weber et al. | |
| 2015/0119485 A1 | * | 4/2015 | Weber | C08G 75/23 521/180 |
| 2018/0044524 A1 | * | 2/2018 | Gallucci | C08L 81/00 |
| 2018/0371171 A1 | * | 12/2018 | Kohinata | C08G 75/23 |

FOREIGN PATENT DOCUMENTS

| | | |
|---|---|---|
| EP | 2669316 A1 | 12/2013 |
| GB | 2341865 A | 3/2000 |
| JP | 06-322130 A | 11/1994 |
| JP | 2007-181969 A | 7/2007 |
| JP | 2009-541508 A | 11/2009 |
| JP | 2013-502476 A | 1/2013 |
| WO | 0166620 A2 | 9/2001 |
| WO | 2009019239 A1 | 2/2009 |
| WO | 2012133641 A1 | 10/2012 |

OTHER PUBLICATIONS

Int'l Search Report dated Feb. 21, 2017 in Int'l Application No. PCT/JP2016/086234.
Extended European Search Report dated Jul. 8, 2019 in EP Application No. 16872978.8.
Office Action dated Oct. 23, 2019 in CN Application No. 201680071048.9 (English Machine Translation).
Office Action dated Mar. 26, 2020 in EP Application No. 16872978.8.

* cited by examiner

*Primary Examiner* — Liam J Heincer
(74) *Attorney, Agent, or Firm* — Panitch Schwarze Belisario & Nadel LLP

(57) ABSTRACT

An aromatic polysulfone resin having a yellowness index of 50 or higher and a weight average molecular weight of 25,000 to 45,000 is provided.

4 Claims, No Drawings

AROMATIC POLYSULFONE RESIN AND METHOD FOR PRODUCING SAME

CROSS-REFERENCE TO RELATED APPLICATION

This application is a Section 371 of International Application No. PCT/JP2016/086234, filed Dec. 6, 2016, which was published in the Japanese language on Jun. 15, 2017 under International Publication No. WO 2017/099080 A1, the disclosure of which is incorporated herein by reference in its entirety.

TECHNICAL FIELD

The present invention relates to an aromatic polysulfone resin and a method for producing the same.

Priority is claimed on Japanese Patent Application No. 2015-239124, filed Dec. 8, 2015, the content of which is incorporated herein by reference.

BACKGROUND ART

Resins having an ultraviolet cutting effect are widely used in fields such as foodstuffs, medical treatment and agriculture for purposes such as the packaging of contents that degrade under ultraviolet light.

Patent Document 1 discloses a resin containing an ultraviolet absorber as an example of a method for producing a resin having this type of ultraviolet cutting effect.

However, although the resin containing an ultraviolet absorber disclosed in the above document is easy to produce, when a molded article molded from that type of resin is used over an extended period of time, problems tend to arise, including a likelihood of precipitation of the ultraviolet absorber at the resin surface, and thermal degradation of the ultraviolet absorber during injection molding processing, and in order to address these problems, the number of materials that can be used tends to be limited.

PRIOR ART LITERATURE

Patent Document

Patent Document 1: JP 2007-181969 A

SUMMARY OF INVENTION

Problems to be Solved by the Invention

The present invention relates to an aromatic polysulfone resin having an ultraviolet cutting effect, and has an object of providing an aromatic polysulfone resin which can suppress any deterioration in the ultraviolet cutting effect when a molded article molded from this type of resin is used over an extended period of time.

Means for Solving the Problems

The present invention includes the following aspects.
[1] An aromatic polysulfone resin having a yellowness index of 50 or higher and a weight average molecular weight of 25.000 to 45,000.
[2] The aromatic polysulfone resin according to [1], having a repeating unit represented by formula (1).

$$-Ph^1-SO_2-Ph^2-O- \quad (1)$$

[$Ph^1$ and $Ph^2$ each independently represent a phenylene group; and each hydrogen atom in the phenylene group may be independently substituted with an alkyl group of 1 to 5 carbon atoms, an aryl group of 6 to 15 carbon atoms or a halogen atom.]
[3] A method for producing an aromatic polysulfone resin having a yellowness index of 50 or higher and a weight average molecular weight of 25.000 to 45,000, the method including a step of melt kneading an aromatic polysulfone resin having a weight average molecular weight of 50.000 to 70,000 at a temperature of 390° C. or higher.

Effects of the Invention

The aromatic polysulfone resin of the present invention can suppress any deterioration in the ultraviolet cutting effect when a molded article molded from the resin is used over an extended period of time.

EMBODIMENTS FOR CARRYING OUT THE INVENTION

The present invention is described below in further detail.

The aromatic polysulfone resin that represents one embodiment of the present invention is an aromatic polysulfone resin having a yellowness index of 50 or higher and a weight average molecular weight (Mw) of 25,000 to 45,000. The yellowness index of the aromatic polysulfone resin is preferably 60 or higher and more preferably 70 or higher, but is preferably not more than 80. In other words, the yellowness index of the aromatic polysulfone resin is preferably 50 or higher but not more than 80, more preferably 60 or higher but not more than 80, and particularly preferably 70 or higher but not more than 80.

Further, in another aspect, the yellowness index may be 57 or higher but not more than 72.

In this description, the "yellowness index" can be determined, as disclosed in the examples described below, by molding the aromatic polysulfone resin into a flat plate-like test piece with a size of 64 mm×64 mm (thickness: 3 mm), and then using a colorimeter to measure the yellowness index based on JIS K 7373.

The weight average molecular weight of the aromatic polysulfone resin is preferably from 30,000 to 45,000, more preferably from 32,000 to 43,000, and particularly preferably from 33,000 to 41,000.

In this description, unless specifically stated otherwise, the "weight average molecular weight" represents the polystyrene-equivalent value measured using the gel permeation chromatography (GPC) method disclosed in the examples described below.

Provided the aromatic polysulfone resin of the present invention has an ultraviolet cutting effect and the yellowness index of the aromatic polysulfone resin falls within the above range, the ultraviolet cutting effect is enhanced, while the transmittance of the visible light region does not decrease too much, which is very desirable. Provided the weight average molecular weight falls within the above range, injection molding becomes possible, which is preferable.

In this description, the "ultraviolet cutting effect" describes an effect which, when the aromatic polysulfone resin of the present invention is formed as a molded article, cuts light from the ultraviolet region that can degrade the contents of the molded article, and for example, means a transmittance through the aromatic polysulfone resin of light from the ultraviolet region (wavelengths of at least 315 nm but not more than 380 nm) of not more than 5%.

In another aspect, the "ultraviolet cutting effect" means a transmittance through the aromatic polysulfone resin of light having a wavelength of 380 nm of not more than 2.5%, and preferably at least 1.3% but not more than 2.5%.

Accordingly, because the aromatic polysulfone resin of the present invention has an ultraviolet cutting effect, it is sometimes referred to as an ultraviolet cutting resin.

In this description, the expression that "the transmittance of the visible light region does not decrease too much" means that the aromatic polysulfone resin of the present invention maintains transmittance of light in the visible light region (400 to 800 nm), and has a degree of transparency that enables the contents to be viewed when the aromatic polysulfone resin is formed as a molded article.

Furthermore, in another aspect, the expression that "the transmittance of the visible light region does not decrease too much" means that the light transmittance of visible light of 650 nm through the aromatic polysulfone resin of the present invention is at least 60% but not more than 90%, preferably at least 62% but not more than 81%, and more preferably at least 62% but not more than 63%.

The aromatic polysulfone resin of the present invention is a resin having a repeating unit that contains a divalent aromatic group (in other words, a residue obtained by removing two hydrogen atoms bonded to the aromatic ring of an aromatic compound) and a sulfonyl group ($—SO_2—$). In terms of heat resistance and chemical resistance, the aromatic polysulfone resin of the present invention preferably has a repeating unit represented by formula (1) shown below (hereinafter sometimes referred to as the repeating unit (1)).

$-Ph^1-SO_2-Ph^2-O—$ (1)

[$Ph^1$ and $Ph^2$ each independently represent a phenylene group; and each hydrogen atom in the phenylene group may be independently substituted with an alkyl group of 1 to 5 carbon atoms, an aryl group of 6 to 15 carbon atoms or a halogen atom.]

Each of the phenylene groups represented by $Ph^1$ and $Ph^2$ may be a p-phenylene group, an m-phenylene group or an o-phenylene group, and a p-phenylene group is preferred. Examples of the alkyl group of 1 to 5 carbon atoms that may substitute a hydrogen atom contained in the phenylene group include a methyl group, ethyl group, n-propyl group, isopropyl group, n-butyl group, isobutyl group, sec-butyl group, tert-butyl group and n-pentyl group.

Examples of the aryl group of 6 to 15 carbon atoms that may substitute a hydrogen atom contained in the phenylene group include a phenyl group, 1-naphthyl group, 2-naphthyl group and p-toluyl group.

In the aromatic polysulfone resin of the present invention, the proportion of the repeating unit represented by the above formula (1), relative to the total weight of all the structural units that constitute the aromatic polysulfone resin, is preferably from 80 to 100% by weight.

The aromatic polysulfone resin according to the present invention can be produced favorably by polycondensation of a corresponding aromatic dihalogenosulfone compound and an aromatic dihydroxy compound in an organic polar solvent, using an alkali metal carbonate salt as a base. For example, a resin having the repeating unit (1) can be produced favorably by using a compound represented by formula (2) shown below (hereinafter sometimes referred to as the compound (2)) as the aromatic dihalogenosulfone compound, and using a compound represented by formula (3) shown below (hereinafter sometimes referred to as the compound (3)) as the aromatic dihydroxy compound.

$X^1-Ph^1-SO_2-Ph^2-X^2$ (2)

[$X^1$ and $X^2$ each independently represent a halogen atom; and $Ph^1$ and $Ph^2$ are the same as defined above.]

$HO-Ph^1-SO_2-Ph^2-OH$ (3)

[$Ph^1$ and $Ph^2$ are the same as defined above.]

Examples of the compound (2) include bis(4-chlorophenyl)sulfone (also called 4,4'-dichlorodiphenylsulfone) and 4-chlorophenyl-3',4'-dichlorophenylsulfone.

Examples of the compound (3) include bis(4-hydroxyphenyl)sulfone (also called 4,4'-dihydroxydiphenylsulfone), bis(4-hydroxy-3,5-dimethylphenyl)sulfone, and bis(4-hydroxy-3-phenylphenyl)sulfone.

The aromatic polysulfone resin according to the present invention may have a repeating unit other than the repeating unit represented by formula (1), and an aromatic polysulfone resin having such a repeating unit other than the repeating unit represented by formula (1) can be produced, for example, by using an aromatic sulfone compound such as 4,4'-bis(4-chlorophenylsulfonyl)biphenyl in addition to the compound (2). Further, a compound having a halogeno group and a hydroxyl group in the molecule, such as 4-hydroxy-4'-(4-chlorophenylsulfonyl)biphenyl may be used instead of all or some of the aromatic dihalogenosulfone compound, the aromatic dihydroxy compound, or both the aromatic dihalogenosulfone compound and the aromatic dihydroxy compound.

The alkali metal carbonate salt may be an alkali carbonate normal salt, may be an alkali bicarbonate acidic salt (also called an alkali hydrogen carbonate), or may be a mixture of the two. The alkali carbonate is preferably sodium carbonate or potassium carbonate, and the alkali bicarbonate is preferably sodium bicarbonate or potassium bicarbonate.

Examples of the organic polar solvent include dimethyl sulfoxide, 1-methyl-2-pyrrolidone, sulfolane (also called 1,1-dioxothiolane), 1,3-dimethyl-2-imidazolidinone, 1,3-diethyl-2-imidazolidinone, dimethyl sulfone, diethyl sulfone, diisopropyl sulfone, and diphenyl sulfone.

The amount used (number of moles) of the aromatic dihalogenosulfone, relative to the amount used (number of moles) of the aromatic dihydroxy compound, is typically from 95 to 110 mol %, and preferably from 100 to 105 mol %. The targeted reaction is a dehydrohalogenation polycondensation of the aromatic dihalogenosulfone and the aromatic dihydroxy compound, and if the assumption is made that no side-reactions occur, then the closer the molar ratio between the two is to 1:1, namely the closer the amount used (number of moles) of the aromatic dihalogenosulfone is to 100 mol % relative to the amount used (number of moles) of the aromatic dihydroxy compound, the higher the degree of polymerization of the obtained aromatic polysulfone resin will become, but in actuality, because of by-product alkali hydroxide and the like, side reactions such as substitution reactions of halogeno groups with hydroxyl groups and depolymerization reactions tend to occur, and these side reactions lower the degree of polymerization of the obtained aromatic polysulfone resin. Accordingly, the amount used (number of moles) of the aromatic dihalogenosulfone compound must be adjusted with due consideration of the level of these side reactions, so as to obtain an aromatic polysulfone resin having the aforementioned prescribed Mw value.

The amount used (number of moles) of the alkali metal carbonate salt, relative to the hydroxyl groups of the aromatic dihydroxy compound, reported as an alkali metal equivalent amount, is typically from 95 to 115 mol %, and preferably from 100 to 110 mol %. If the assumption is made that no side-reactions occur, then the larger the amount used of the alkali metal carbonate salt, the more rapidly the targeted polycondensation proceeds, and therefore the higher the degree of polymerization of the obtained aromatic polysulfone resin will become, but in actuality, the larger the amount used of the alkali metal carbonate salt, the more readily the same side reactions as those mentioned above occur, and these side reactions lower the degree of polymerization of the obtained aromatic polysulfone resin. Accordingly, the amount used (number of moles) of the alkali metal carbonate salt must be adjusted with due consideration of the level of these side reactions, so as to obtain an aromatic polysulfone resin having the prescribed Mw value.

In a typical method for producing the aromatic polysulfone resin, as a first step, the aromatic dihalogenosulfone compound and the aromatic dihydroxy compound are dissolved in an organic polar solvent, as a second step, an alkali metal carbonate salt is added to the solution obtained in the first step, and the aromatic dihalogenosulfone compound and the aromatic dihydroxy compound are subjected to a polycondensation, and as a third step, unreacted alkali metal carbonate salt, by-product alkali halides and the organic polar solvent are removed from the reaction mixture obtained in the second step to acquire the aromatic polysulfone resin.

The dissolution temperature for the first step is preferably from 40 to 180° C. Further, the polycondensation temperature for the second step is preferably from 180 to 400° C. If the assumption is made that no side-reactions occur, then the higher the polycondensation temperature, the more rapidly the targeted polycondensation proceeds, and therefore the higher the degree of polymerization of the obtained aromatic polysulfone resin will become, but in actuality, the higher the polycondensation temperature, the more readily the same side reactions as those mentioned above occur, and these side reactions lower the degree of polymerization of the obtained aromatic polysulfone resin. Accordingly, the polycondensation temperature must be adjusted with due consideration of the level of these side reactions, so as to obtain an aromatic polysulfone resin having the prescribed Mw value.

Further, the polycondensation of the second step is typically performed by gradually increasing the temperature, while removing the water generated as a by-product, until the reflux temperature of the organic polar solvent is reached, and then holding that temperature, typically for 1 hour to 50 hours, and more preferably for 10 hours to 30 hours. If the assumption is made that no side-reactions occur, then the longer the polycondensation time, the more the targeted polycondensation proceeds, and therefore the higher the degree of polymerization of the obtained aromatic polysulfone becomes, but in actuality, the longer the polycondensation time, the more the same side reactions as those mentioned above proceed, and these side reactions cause a reduction in the degree of polymerization of the obtained aromatic polysulfone. Accordingly, the polycondensation time must be adjusted with due consideration of the level of these side reactions, so as to obtain an aromatic polysulfone resin having the prescribed Mw value.

In the third step, first, the unreacted alkali metal carbonate salt and the by-product alkali halides are removed from the reaction mixture obtained in the second step by filtration or centrifugal separation or the like, thus obtaining a solution containing the aromatic polysulfone resin dissolved in the organic polar solvent. Subsequently, the aromatic polysulfone resin can be obtained by removing the organic polar solvent from this solution. Removal of the organic polar solvent may be performed by distilling and removing the organic polar solvent directly from the solution, or by mixing the solution with a poor solvent for the aromatic polysulfone resin, thereby precipitating the aromatic polysulfone resin, and then separating the aromatic polysulfone resin by filtration or centrifugal separation or the like.

Examples of the poor solvent for the aromatic polysulfone resin include methanol, ethanol, isopropylalcohol, hexane, heptane and water, and methanol is preferable in terms of being easy to remove.

Furthermore, in those cases where an organic polar solvent having a comparatively high melting point is used as the polymerization solvent, the reaction mixture obtained in the second step may be cooled, solidified and then crushed, the unreacted alkali metal carbonate salt and by-product alkali halides may then be removed from the thus obtained powder by extraction using water, and the organic polar solvent may be extracted and removed using a solvent that does not dissolve the aromatic polysulfone resin but does dissolve the organic polar solvent.

In terms of extraction efficiency and extraction workability, the volume average particle size of the above powder is preferably from 200 to 2.000 μm, more preferably from 250 to 1,500 μm, and even more preferably from 300 to 1,000 μm. If the volume average particle size falls within the above range, then the extraction efficiency is favorable, no solidification occurs during extraction, and blockages tend to be less likely to occur when performing filtering or drying following the extraction, all of which are desirable.

The "volume average particle size" mentioned here refers to a value measured by a laser diffraction method.

Examples of the extraction solvent, for example in the case where diphenyl sulfone is used as the polymerization solvent, include mixed solvents of acetone and methanol. The mixing ratio between the acetone and methanol is usually determined based on the extraction efficiency and the sticking tendency of the aromatic polysulfone resin powder.

Further, in an alternative typical method for producing an aromatic polysulfone, as a first step, the aromatic dihydroxy compound and an alkali metal carbonate salt are reacted in an organic polar solvent and the by-product water is removed, as a second step, the aromatic dihalogenosulfone compound is added to the reaction mixture obtained in the first step and a polycondensation is performed, and as a third step, in a similar manner to that described above, unreacted alkali metal carbonate salt, by-product alkali halides and the organic polar solvent are removed from the reaction mixture obtained in the second step to acquire the aromatic polysulfone resin.

In this alternative method, in order to remove the by-product water in the first step, an organic solvent that undergoes azeotropic distillation with water may be added, and dewatering may then be performed by azeotropic distillation. Examples of organic solvents that undergo azeotropic distillation with water include benzene, chlorobenzene, toluene, methyl isobutyl ketone, hexane and cyclohexane. The temperature of the azeotropic dewatering is typically from 70 to 200° C.

Further, in this alternative method, the polycondensation temperature in the second step is preferably from 40 to 180° C., and in a similar manner to that described above, the polycondensation temperature and the polycondensation time must be adjusted with due consideration of the level of side reactions, so as to obtain an aromatic polysulfone resin having the prescribed Mw value. By using the above method, an aromatic polysulfone resin having a weight average molecular weight (Mw) of 50,000 to 70,000 according to the present invention can be produced favorably.

The weight average molecular weight (Mw) of the aromatic polysulfone resin of the present invention is from 25,000 to 45,000. If the Mw is less than the above lower limit, then the mechanical strength and durability of the aromatic polysulfone resin become inadequate. Further, if the Mw exceeds the above upper limit, then the injection molding processability deteriorates. In other words, provided the Mw is at least as large as the lower limit, the mechanical strength and durability of the aromatic polysulfone resin are satisfactory, and provided the Mw is not higher than the upper limit, the injection molding processability is favorable.

The aromatic polysulfone resin of the present invention can be obtained as an aromatic polysulfone resin having a yellowness index of 50 or higher and a weight average molecular weight (Mw) of 25,000 to 45,000 by melt kneading of the aromatic polysulfone resin having a weight average molecular weight (Mw) of 50,000 to 70,000 at a temperature of 390° C. or higher, but preferably not more than 400° C., for at least 1 minute, but preferably not more than 5 minutes.

The temperature mentioned here refers to the cylinder temperature in the apparatus used for the melt kneading.

Generally, aromatic polysulfone resins have a high degree of transparency, and the transmittance of light from the ultraviolet region (wavelengths of at least 315 nm but not more than 380 nm) is often at least 20% but not more than 40%. When processing the resin into an arbitrary shape by injection molding, pellets obtained by subjecting the powdered resin to a melt kneading step are used, but in the present invention, it was discovered that by controlling the conditions of the melt kneading step for the aromatic polysulfone resin, the transmittance of light in the ultraviolet region (wavelengths of at least 315 nm but not more than 380 nm) for the aromatic polysulfone resin obtained following melt kneading could be cut, while the transmittance of light in the visible light region (400 to 800 nm) could be maintained.

Moreover, because the melt kneading step described above is accompanied by a phenomenon in which the weight average molecular weight of the resin decreases, the weight average molecular weight prior to melt kneading is adjusted to ensure that the weight average molecular weight (Mw) following the melt kneading step falls within the range from 25,000 to 45,000. Accordingly, the Mw of the aromatic polysulfone resin prior to melt kneading is preferably from 50,000 to 70,000.

This is because if the Mw prior to melt kneading is less than the above lower limit, then achieving a Mw value (of at least 25,000) following the melt kneading step that ensures favorable mechanical strength and durability for the aromatic polysulfone resin becomes difficult. Further, if the Mw prior to melt kneading exceeds the above upper limit, then achieving a Mw value (of not more than 45,000) following the melt kneading step that ensures favorable hot molding processability becomes difficult. In other words, provided the Mw prior to melt kneading is at least as large as the lower limit, a Mw value (of at least 25,000) can be achieved following the melt kneading step that ensures favorable mechanical strength and durability for the aromatic polysulfone resin, whereas provided the Mw prior to melt kneading is not higher than the upper limit, a Mw value (of not more than 45,000) can be achieved following the melt kneading step that yields favorable hot molding processability.

Examples of the aromatic polysulfone resin prior to the melt kneading step include resins having a weight average molecular weight of 50,000 to 70,000 that have been used once for molding or the like of products used in medical applications, and for example, so-called waste materials such as runners and other materials unfit for use as products due to end cutting or retention during the molding process can be reused.

Generally, when a resin is heated and molded such as during injection molding, in order to lower the viscosity of the resin, heated molding is performed at a temperature that is 50 to 150° C. higher than the melting point or glass transition point, and if heated molding is performed at a temperature exceeding this value, then oxidative decomposition of the resin molecular chain starts to occur. In the present invention, by performing melt kneading of the resin at a temperature at least as high as the temperature at which this oxidative decomposition of the molecular chain appears (for example, at least 390° C. but not more than 400° C.), the transmittance in the ultraviolet region is controlled.

Further, in one aspect, the aromatic polysulfone resin of the present invention may also include a filler, provided the objects of the present invention are not impaired. Examples of the filler include inorganic fillers, and examples of these inorganic fillers include glass fibers, micas, talcs, glass beads, silica beads and glass balloons. One of these fillers may be added alone, or two or more fillers may be included.

The aromatic polysulfone resin obtained in the manner described above has a light transmittance at 380 nm in the ultraviolet region of not more than 5%, and preferably 2.5% or less, and has a light transmittance at 650 nm in the visible light region of at least 60%, and preferably 62% or higher, and is a resin which when formed into a molded article, cuts light in the ultraviolet region that can degrade the contents inside the molded article, but has a degree of transparency that enables the contents to be viewed.

Another aspect of the aromatic polysulfone resin of the present invention is obtained by polycondensation of:
an aromatic dihalogenosulfone compound (2) represented by formula (2) above, and preferably 4,4'-dichlorodiphenylsulfone, and
an aromatic dihydroxy compound represented by formula (3) above, and preferably 4,4'-dihydroxydiphenylsulfone,
the aromatic polysulfone resin having:
a weight average molecular weight of 25,000 to 45,000, and preferably 33,000 to 41,000, and
a yellowness index of at least 50 but not more than 80, and preferably at least 57 but not more than 72.

Another aspect of the method for producing an aromatic polysulfone resin of the present invention includes:
a step of obtaining an aromatic polysulfone resin having a weight average molecular weight of 50,000 to 70,000, and preferably 51.000 to 65,000 by performing a polycondensation of:
an aromatic dihalogenosulfone compound (2) represented by formula (2) above, and preferably 4,4'-dichlorodiphenylsulfone, and
an aromatic dihydroxy compound represented by formula (3) above, and preferably 4,4'-dihydroxydiphenylsulfone,
in an organic polar solvent, and preferably in diphenyl sulfone, using an alkali metal carbonate salt, and preferably potassium carbonate, as a base; and a step of melt kneading the aromatic polysulfone resin obtained in the above step at a temperature of at least 390° C. but not more than 400° C.; wherein the resulting aromatic polysulfone resin has a weight average molecular weight of 25,000 to 45,000, and preferably 33,000 to 41,000, and a yellowness index of at least 50 but not more than 80, and preferably at least 57 but not more than 72.

In yet another aspect of the method for producing an aromatic polysulfone resin of the present invention, the above melt kneading step is a step performed under arbitrary conditions, such that when melt kneading of the aromatic polysulfone resin having a weight average molecular weight of 50,000 to 70,000 is performed at a temperature of at least 390° C. but not more than 400° C., an aromatic polysulfone resin is produced that has a weight average molecular weight of 25,000 to 45,000, and preferably 33,000 to 41,000, and a yellowness index of at least 50 but not more than 80, and preferably at least 57 but not more than 72.

In yet another aspect, the above melt kneading step is a step in which melt kneading is performed using a twin-screw extruder.

EXAMPLES

Examples of the present invention are presented below, but the present invention is in no way limited by these examples.

[Measurement of Mw of Aromatic Polysulfone Resins]

Gel permeation chromatography (GPC) analyses were performed under the following conditions to determine Mw.

Sample: 50 µL injection of an N,N-dimethylformamide solution of the aromatic polysulfone resin with a concentration of 0.003 g/mL Columns: two connected TSKgel $GMH_{HR}$-H (7.8 mmø× 300 mm) columns, manufactured by Tosoh Corporation Column temperature: 40° C.

Eluent: N,N-dimethylformamide

Eluent flow rate: 0.8 mL/minute

Detector: differential refractive index meter (RI)+multi angle light scattering photometer (MALS)

Standard reagents: polystyrene

[Evaluation of Yellowness Index of Aromatic Polysulfone Resins]

The aromatic polysulfone resins obtained in Examples 1 to 3 and Comparative Examples 1 to 3 were each molded into a flat plate-like test piece with a size of 64 mm×64 mm (thickness: 3 mm), using a PS40E1ASE injection molding machine manufactured by Nissei Plastic Industrial Co., Ltd. under conditions including a cylinder temperature of 370° C. a mold temperature of 150° C. and an injection speed of 40%. A colorimeter ZE-2000 manufactured by Nippon Denshoku Industries Co., Ltd. was then used to measure the yellowness index of each of these flat plate-like test pieces based on JIS K 7373.

[Evaluation of Light Transmittance of Aromatic Polysulfone Resins]

The aromatic polysulfone resins obtained in Examples 1 to 3 and Comparative Examples 1 to 3 were each molded into a flat plate-like test piece with a size of 64 mm×64 mm (thickness: 3 mm), using a PS40E1 ASE injection molding machine manufactured by Nissei Plastic Industrial Co., Ltd. under conditions including a cylinder temperature of 370° C., a mold temperature of 150° C. and an injection speed of 40%. A spectrophotometer U-3500 manufactured by Hitachi, Ltd. was then used to measure the light transmittance of each of these flat plate-like test pieces at 380 nm and 650 nm.

Example 1

A polymerization tank fitted with a stirrer, a nitrogen inlet tube, a thermometer, and a condenser having a receiver at the tip thereof was charged with 500 g of 4,4'-dihydroxydiphenylsulfone, 589 g of 4,4'-dichlorodiphenylsulfone, and 942 g of diphenyl sulfone as a polymerization solvent, and the temperature was raised to 180° C. while the inside of the tank was flushed with nitrogen gas. Next, 283 g of potassium carbonate was added to the obtained solution, the temperature was then raised gradually to 290° C., and the reaction was allowed to proceed at 290° C. for a further 2 hours. The thus obtained reaction solution was cooled to room temperature (about 25° C.) and solidified, and following fine crushing, the product was washed several times with hot water and washed several times with a mixed solvent of acetone and methanol, and subsequently dried by heating at 150° C. thus obtaining a powder of an aromatic polysulfone resin with terminal chloro groups.

The Mw of this aromatic polysulfone resin (the Mw prior to melt kneading) was then measured.

Subsequently, the obtained aromatic polysulfone resin was supplied to the cylinder of a twin-screw extruder (PCM-30, manufactured by Ikegai, Ltd.), strands were obtained by performing melt kneading and extrusion at a cylinder temperature of 390° C., and these strands were cut to obtain pellets.

Next, the Mw of the thus obtained aromatic polysulfone resin (the Mw following melt kneading) was measured.

Subsequently, the yellowness index and the light transmittance of the obtained aromatic polysulfone resin were measured.

Example 2

A polymerization tank fitted with a stirrer, a nitrogen inlet tube, a thermometer, and a condenser having a receiver at the tip thereof was charged with 500 g of 4,4'-dihydroxydiphenylsulfone, 589 g of 4,4'-dichlorodiphenylsulfone, and 942 g of diphenyl sulfone as a polymerization solvent, and the temperature was raised to 180° C. while the inside of the tank was flushed with nitrogen gas. Next, 287 g of potassium carbonate was added to the obtained solution, the temperature was then raised gradually to 290° C. and the reaction was allowed to proceed at 290° C. for a further 2 hours. The thus obtained reaction solution was cooled to room temperature (about 25° C.) and solidified, and following fine crushing, the product was washed several times with hot water and washed several times with a mixed solvent of acetone and methanol, and subsequently dried by heating at 150° C., thus obtaining a powder of an aromatic polysulfone resin with terminal chloro groups. The Mw of this aromatic polysulfone resin (the Mw prior to melt kneading) was then measured.

Subsequently, the obtained aromatic polysulfone resin was supplied to the cylinder of a twin-screw extruder (PCM-30, manufactured by Ikegai, Ltd.), strands were obtained by performing melt kneading and extrusion at a cylinder temperature of 395° C., and these strands were cut to obtain pellets.

Next, the Mw of the thus obtained aromatic polysulfone resin (the Mw following melt kneading) was measured.

Subsequently, the yellowness index and the light transmittance of the obtained aromatic polysulfone resin were measured.

Example 3

An aromatic polysulfone resin obtained using the same method as Example 2 was supplied to the cylinder of a twin-screw extruder (PCM-30, manufactured by Ikegai, Ltd.), strands were obtained by performing melt kneading and extrusion at a cylinder temperature of 400° C., and these strands were cut to obtain pellets.

Next, the Mw of the thus obtained aromatic polysulfone resin (the Mw following melt kneading) was measured.

Subsequently, the yellowness index and the light transmittance of the obtained aromatic polysulfone resin were measured.

Comparative Example 1

A polymerization tank fitted with a stirrer, a nitrogen inlet tube, a thermometer, and a condenser having a receiver at the tip thereof was charged with 500 g of 4,4'-dihydroxydiphenylsulfone, 593 g of 4,4'-dichlorodiphenylsulfone, and 949 g of diphenyl sulfone as a polymerization solvent, and the temperature was raised to 180° C. while the inside of the tank was flushed with nitrogen gas. Next, 287 g of anhydrous potassium carbonate was added to the obtained solution, the temperature was then raised gradually to 290° C., and the reaction was allowed to proceed at 290° C. for a further 2 hours. The thus obtained reaction solution was cooled to room temperature (about 25° C.) and solidified, and following fine crushing, the product was washed several times with hot water and washed several times with a mixed solvent of acetone and methanol, and subsequently dried by heating at 150° C., thus obtaining a powder of an aromatic polysulfone resin with terminal chloro groups. Next, the Mw of this aromatic polysulfone resin (the Mw prior to melt kneading) was measured.

Subsequently, the obtained aromatic polysulfone resin was supplied to the cylinder of a twin-screw extruder (PCM-30, manufactured by Ikegai, Ltd.), strands were obtained by performing melt kneading and extrusion at a cylinder temperature of 380° C., and these strands were cut to obtain pellets.

Next, the Mw of the thus obtained aromatic polysulfone resin (the Mw following melt kneading) was measured.

Subsequently, the yellowness index and the light transmittance of the obtained aromatic polysulfone resin were measured.

Comparative Example 2

A polymerization tank fitted with a stirrer, a nitrogen inlet tube, a thermometer, and a condenser having a receiver at the tip thereof was charged with 500 g of 4,4'-dihydroxydiphenylsulfone, 593 g of 4,4'-dichlorodiphenylsulfone, and 949 g of diphenyl sulfone as a polymerization solvent, and the temperature was raised to 180° C. while the inside of the tank was flushed with nitrogen gas. Next, 287 g of anhydrous potassium carbonate was added to the obtained solution, the temperature was then raised gradually to 290° C. and the reaction was allowed to proceed at 290° C. for a further 2.5 hours. The thus obtained reaction solution was cooled to room temperature (about 25° C.) and solidified, and following fine crushing, the product was washed several times with hot water and washed several times with a mixed solvent of acetone and methanol, and subsequently dried by heating at 150° C., thus obtaining a powder of an aromatic polysulfone resin with terminal chloro groups. The Mw of this aromatic polysulfone resin (the Mw prior to melt kneading) was then measured. The obtained aromatic polysulfone resin was supplied to the cylinder of a twin-screw extruder (PCM-30, manufactured by Ikegai, Ltd.), strands were obtained by performing melt kneading and extrusion at a cylinder temperature of 385° C., and these strands were cut to obtain pellets.

Next, the Mw of the thus obtained aromatic polysulfone resin (the Mw following melt kneading) was measured.

Subsequently, the yellowness index and the light transmittance of the obtained aromatic polysulfone resin were measured.

Comparative Example 3

The aromatic polysulfone resin obtained in Example 1 was supplied to the cylinder of a twin-screw extruder (PCM-30, manufactured by Ikegai, Ltd.), strands were obtained by performing melt kneading and extrusion at a cylinder temperature of 365° C., and these strands were cut to obtain pellets.

Next, the Mw of the thus obtained aromatic polysulfone resin (the Mw following melt kneading) was measured using the method for measuring the Mw of aromatic polysulfone resins described above Further, the yellowness index and the light transmittance of the obtained aromatic polysulfone resin were also measured using the measurement methods described above. The measurement results for the weight average molecular weights (Mw) of the aromatic polysulfone resin before and after melt kneading, the yellowness index and the light transmittance are shown in Table 1.

TABLE 1

|  |  | Example 1 | Example 2 | Example 3 | Comparative Example 1 | Comparative Example 2 | Comparative Example 3 |
|---|---|---|---|---|---|---|---|
| Weight average molecular weight Mw | prior to melt kneading | 51000 | 65000 | 65000 | 42000 | 45000 | 51000 |
|  | following melt kneading | 36000 | 41000 | 33000 | 36000 | 32000 | 51000 |
| Yellowness index | — | 57 | 64 | 72 | 25 | 41 | 24 |
| Transmittance (380 nm) | % | 2.5 | 1.7 | 1.3 | 33 | 9.0 | 33 |
| Transmittance (650 nm) | % | 63 | 63 | 62 | 81 | 62 | 81 |

INDUSTRIAL APPLICABILITY

Because the aromatic polysulfone resin of the present invention does not contain an ultraviolet absorber, when a molded article molded from the resin is used over an extended period of time, it is expected that any deterioration in the ultraviolet cutting effect can be suppressed, meaning the resin is useful industrially.

The invention claimed is:

1. An aromatic polysulfone resin having a repeating unit represented by formula (1):

$$-Ph^1-SO_2-Ph^2O- \tag{1}$$

wherein $Ph^1$ and $Ph^2$ each independently represent a phenylene group, and each hydrogen atom in the phenylene group may be independently substituted with an alkyl group of 1 to 5 carbon atoms, an aryl group of 6 to 15 carbon atoms or a halogen atom;
 a yellowness index of 50 or higher; and
 a weight average molecular weight of 25,000 to 45,000, and
 wherein the proportion of the repeating unit represented by formula (1) relative to the total weight of all structural units that constitute the aromatic polysulfone resin is 80 to 100% by weight.

2. The aromatic polysulfone according to claim 1, having a light transmittance at 380 nm of not more than 5% and a light transmittance at 650 nm of at least 60%.

3. The aromatic polysulfone according to claim 1, wherein the proportion of the repeating unit represented by formula (1) relative to the total weight of all the structural units that constitute the aromatic polysulfone resin is 100% by weight.

4. A method for producing an aromatic polysulfone resin having a yellowness index of 50 or higher and a weight average molecular weight of 25,000 to 45,000, the method comprising a step of melt kneading an aromatic polysulfone resin having a weight average molecular weight of 50,000 to 70,000 at a temperature of 390° C. or higher.

* * * * *